(12) United States Patent
Sato et al.

(10) Patent No.: US 8,339,546 B2
(45) Date of Patent: *Dec. 25, 2012

(54) LIQUID CRYSTAL DISPLAY DEVICE WITH A PAIR OF DISCOTIC VIEWING ANGLE COMPENSATING FILMS

(75) Inventors: Hiroki Sato, Tokyo (JP); Kunpei Kobayashi, Tachikawa (JP); Mamoru Yoshida, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/827,542

(22) Filed: Jun. 30, 2010

(65) Prior Publication Data

US 2010/0265452 A1    Oct. 21, 2010

Related U.S. Application Data

(63) Continuation of application No. 11/369,155, filed on Mar. 6, 2006, now Pat. No. 7,864,278.

(30) Foreign Application Priority Data

Mar. 9, 2005 (JP) ................................. 2005-064970

(51) Int. Cl.
*G02F 1/1335* (2006.01)
(52) U.S. Cl. ........................................ 349/119; 349/117
(58) Field of Classification Search ........... 349/117–121
See application file for complete search history.

(56) References Cited

U.S. PATENT DOCUMENTS

| | | | |
|---|---|---|---|
| 5,880,798 A | 3/1999 | Walton et al. | |
| 6,261,649 B1 * | 7/2001 | Takagi et al. | 428/1.1 |
| 6,327,010 B1 | 12/2001 | Scheuble et al. | |
| 6,445,437 B1 | 9/2002 | Miyazaki et al. | |
| 6,542,210 B1 | 4/2003 | Wu | |
| 6,587,171 B1 | 7/2003 | Georges et al. | |
| 6,661,484 B1 * | 12/2003 | Iwai et al. | 349/107 |

(Continued)

FOREIGN PATENT DOCUMENTS

CN    1340729 A    3/2002

(Continued)

OTHER PUBLICATIONS

Taiwanese Office Action dated Aug. 18, 2009, and English translation thereof, issued in counterpart Taiwanese Application No. 095107700.

(Continued)

*Primary Examiner* — Jessica M Merlin
(74) *Attorney, Agent, or Firm* — Holtz, Holtz, Goodman & Chick, PC

(57) ABSTRACT

A liquid crystal display device includes a liquid crystal layer which is arranged between first and second aligning films formed on inner sides of first and second substrates, has liquid crystal molecules twist-aligned in a direction from the first aligning film toward the second aligning film when an electric field is not applied between first and second electrodes, and generates retardation of substantially λ/2 with respect to transmitted light. First and second polarizing plates are arranged on outer sides of the first and second substrates. A transmission axis or an absorption axis of the first polarizing plate is substantially matched with a direction along which the liquid crystal molecules in the vicinity of the first aligning film are aligned when a sufficiently intensive electric field is applied.

11 Claims, 13 Drawing Sheets

U.S. PATENT DOCUMENTS

| | | |
|---|---|---|
| 6,985,198 B2 | 1/2006 | Kume et al. |
| 2002/0047968 A1 | 4/2002 | Yoshida et al. |
| 2003/0058393 A1 | 3/2003 | Terashita et al. |
| 2005/0151903 A1* | 7/2005 | Okumura ....................... 349/117 |
| 2006/0061709 A1* | 3/2006 | Lin ................................. 349/99 |
| 2010/0265437 A1 | 10/2010 | Sato et al. |

FOREIGN PATENT DOCUMENTS

| | | |
|---|---|---|
| EP | 0 834 752 A1 | 4/1998 |
| JP | 6-88962 A | 3/1994 |
| JP | 10-083000 A | 3/1998 |
| JP | 2002-014333 A | 1/2002 |
| TW | 525022 B | 3/2003 |

OTHER PUBLICATIONS

Hiroki Sato, et al., "Liquid Crystal Display Device," U.S. Appl. No. 12/827,655, filed Jun. 30, 2010.

Taiwanese Office Action dated Dec. 7, 2010 (and English translation thereof) in counterpart Taiwanese Application No. 098139287.

* cited by examiner

LIQUID CRYSTAL DISPLAY DEVICE WITH A PAIR OF DISCOTIC VIEWING ANGLE COMPENSATING FILMS

CROSS-REFERENCE TO RELATED APPLICATIONS

This is a Continuation Application of U.S. application Ser. No. 11/369,155, filed Mar. 6, 2006, which is based upon and claims the benefit of priority from prior Japanese Patent Application No. 2005-064970, filed Mar. 9, 2005, the entire contents of both of which are incorporated herein by reference.

BACKGROUND OF THE INVENTION

1. Field of the Invention

The present invention relates to a liquid crystal display device having a liquid crystal layer in which liquid crystal molecules are twist-aligned at an angle of substantially 90°.

2. Description of the Related Art

There has been conventionally known a twisted nematic type liquid crystal display device in which liquid crystal molecules in a liquid crystal layer held between a pair of substrates are twist-aligned from one substrate toward the other substrate. As disclosed in Jpn. Pat. Appln. KOKAI Publication No. 88962-1994, in a TN type liquid crystal display device in which liquid crystal molecules are twist-aligned at an angle of approximately 90°, each polarizing plate is set on a front side which is an observation side of display of a liquid crystal cell including a twisted nematic liquid crystal layer and on a rear side which is an opposite side of the front side.

An optical axis of one of a transmission axis and an absorption axis of each of the pair of polarizing plates is positioned in a direction parallel with or perpendicular to a direction of aligning treatment applied to an aligning film of each substrate of the liquid crystal cell, and optical axes of the respective polarizing plates are arranged to be parallel with or perpendicular to each other. In the liquid crystal display device in which the optical axes of the respective polarizing plates are arranged in parallel with each other, dark display in which transmission of light is substantially prevented (normally black display) is obtained in a state where an electric field is not substantially applied to the liquid crystal layer (a normally state). Further, in the liquid crystal display device in which the optical axes of the respective polarizing plates are arranged to be perpendicular to each other, bright display in which light transmission becomes maximum (normally white display) is obtained in the normally state.

In the normally white display, in order to obtain dark display, a sufficiently intensive electric field is applied to the liquid crystal layer to rise the liquid crystal molecules in a direction vertical to the substrates, and the twisted alignment state is released, thereby obtaining dark display.

However, in the normally white display, since the liquid crystal molecules are strongly affected by an alignment restricting force by the aligning treatment applied to the aligning films in the vicinity of each aligning film provided on an inner surface of each substrate which is in contact with the liquid crystal to restrict alignment of the liquid crystal molecules, a so-called "anchoring effect" by which behaviors of the liquid crystal molecules are suppressed provokes a reduction in contrast at the time of application of the electric field mentioned above (at the time of on) or tone reversal in an intermediate tone, thereby resulting in a decrease in display quality.

BRIEF SUMMARY OF THE INVENTION

It is an object of the present invention to provide a liquid crystal display device which can obtain normally white display with a good quality which has sufficiently high contrast and has no tone reversal in an intermediate tone.

According to a first aspect of the present invention, there is provided a liquid crystal display device comprising:

a first substrate having at least one first electrode on one side;

a second substrate which is arranged to face said one side of the first substrate, and has at least one second electrode facing the first electrode on one side facing the first substrate;

a first aligning film which is provided on said one side of the first substrate, and subjected to aligning treatment in a first direction;

a second aligning film which is provided on said one side of the second substrate, and subjected to aligning treatment in a second direction crossing the first direction at a predetermined angle;

a liquid crystal layer which is arranged between the first aligning film and the second aligning film, has liquid crystal molecules twist-aligned in a predetermined direction from the first aligning film toward the second aligning film when an electric field is not applied between the first and second electrodes, and generates retardation of substantially λ/2 with respect to transmitted light;

a first polarizing plate which is arranged on an opposite side of the first substrate, and arranged in such a manner that an optical axis of one of a transmission axis and an absorption axis is substantially matched with a third direction along which the liquid crystal molecules in the vicinity of the first aligning film are aligned when a sufficiently intensive electric field is applied between the first and second electrodes; and a second polarizing plate which is arranged on an opposite side of the second substrate, and arranged in such a manner that an optical axis of one of a transmission axis and an absorption axis is set to be substantially perpendicular to the optical axis of the first polarizing plate.

According to a second aspect of the present invention, there is provided a liquid crystal display device comprising:

a first substrate having at least one first electrode on one side;

a second substrate which is arranged to face the one side of the first substrate, and has at least one second electrode facing the first electrode on an opposite side of the first substrate;

a first aligning film which is arranged on the one side of the first substrate, and subjected to aligning treatment in a first direction inclined at substantially 45° with respect to a horizontal line in a lateral direction as seen from an observation side;

a second aligning film which is arranged on the one side of the second substrate, and subjected to aligning treatment in a second direction crossing the first direction at substantially 90°;

a liquid crystal layer which is arranged between the first aligning film and the second aligning film, has liquid crystal molecules twist-aligned at substantially 90° from the first aligning film toward the second aligning film when an electric field is not applied between the first and second electrodes, and generates retardation of substantially λ/2 with respect to transmitted light;

a pair of viewing angle compensating films formed of discotic liquid crystal layers which are respectively arranged between the first polarizing plate and the first substrate and between the second polarizing plate and the second substrate in such a manner that their respective optical axes are set in substantially parallel with directions of aligning treatment processing applied to the aligning films of the respective adjacent substrates;

a first polarizing plate which is arranged on an opposite side of the first substrate in such a manner that an optical axis of one of a transmission axis and an absorption axis is substantially matched with a third direction along which the liquid crystal molecules in the vicinity of the first aligning film are arranged when a sufficiently intensive electric field is applied between the first and second electrodes; and a second polarizing plate which is arranged on an opposite side of the second substrate in such a manner that an optical axis of one of a transmission axis and an absorption axis becomes substantially perpendicular to the optical axis of the first polarizing plate.

Furthermore, according to a third aspect of the present invention, there is provided a liquid crystal display device comprising:

a first substrate having at least one first electrode formed on one side;

a second substrate which is arranged to face the one side of the first substrate, and has at least one second electrode facing the first electrode on one side facing the first substrate;

a first aligning film which is arranged on the one side of the first substrate, and subjected to aligning treatment in a first direction inclined at substantially 45° with respect to a horizontal line in a lateral direction as seen from an observation side;

a second aligning film which is arranged on the one side of the second substrate, and subjected to aligning treatment in a second direction crossing the first direction at substantially 90°;

a liquid crystal layer which is arranged between the first aligning film and the second aligning film, has liquid crystal molecules twist-aligned at substantially 90° in a predetermined direction from the first aligning film toward the second aligning film when an electric field is not applied between the first and second electrodes, and generates retardation which is substantially $\lambda/2$ with respect to transmitted light;

a pair of viewing angle compensating films formed of discotic liquid crystal layers which are respectively arranged between the first polarizing plate and the first substrate and between the second polarizing plate and the second substrate in such a manner that their respective optical axes become parallel with directions of aligning treatment processing applied to the aligning films of the respective adjacent substrates;

a pair of retardation plates which are respectively arranged between the first polarizing plate and the viewing angle compensating film adjacent thereto and between the second polarizing plate and the viewing angle compensating film adjacent thereto in such a manner that an optical axis of one of a phase advancing axis and a phase delaying axis becomes substantially parallel with a direction of the optical axis of each of the adjacent viewing angle compensating films;

a first polarizing plate which is arranged on an opposite side of the first substrate in such a manner that an optical axis of one of a transmission axis and an absorption axis substantially matches with a third direction along which the liquid crystal molecules in the vicinity of the first aligning film are aligned when a sufficiently intensive electric field is applied between the first and second electrodes; and a second polarizing plate which is arranged on an opposite side of the second substrate in such a manner that an optical axis of one of a transmission axis and an absorption axis becomes substantially perpendicular to the optical axis of the first polarizing plate.

According to the liquid crystal display device of the present invention, at the time of on where a sufficiently high electric field is applied to the liquid crystal layer, an optical axis of a polarizing plate set on an outer surface of the substrate having an aligning film provided thereon is matched with a third direction in which liquid crystal molecules in the vicinity of the aligning film are arranged. Therefore, linear polarized light which enters the liquid crystal layer at the time of on is transmitted through the liquid crystal layer without being affected by birefringence based on an arrangement of the liquid crystal molecules in the vicinity of the aligning film, and assuredly absorbed by the other polarizing plate arranged to be perpendicular to an optical axis on an opposed substrate side. As a result, sufficiently dark display can be obtained, and hence normally white display with a good quality which has high contrast and no none reversal in an intermediate tone can be stably acquired.

In the liquid crystal display device according to the first aspect of the present invention, it is preferable to arrange the first polarizing plate in such a manner that an optical axis of the first polarizing plate matches with a third direction which is a direction of an intermediate angle in a twist angle range in which the liquid crystal molecules in the liquid crystal layer are twist-aligned from the first aligning film toward the second aligning film. That is, the first polarizing plate is arranged in such a manner that its optical axis matches with the third direction rotated from an aligning treatment direction of one of the first and second aligning films toward the aligning treatment direction of the other one at an angle which is substantially ½ of an angle formed between the aligning treatment direction of the first aligning film and the aligning treatment direction of the second aligning film. Moreover, it is preferable that the second aligning film is subjected to aligning treatment in a second direction crossing a first direction which is the aligning treatment direction of the first aligning film at substantially 90°, and that the liquid crystal molecules in the liquid crystal layer are twist-aligned at an angle of 90° from the first aligning film toward the second aligning film. Additionally, it is desirable that each of the first and second substrates is constituted of a rectangular substrate having upper and lower sides extending in a lateral direction and right and left sides extending in a vertical direction as seen from an observation side, each of the first and second aligning films is subjected to aligning treatment in a direction of 45° with respect to a horizontal axis parallel with the upper and lower sides of the rectangular substrate, the first polarizing plate is arranged in such a manner that its transmission axis faces a direction perpendicular to the horizontal axis, and the second polarizing plate is arranged in such a manner that its transmission axis is parallel with the horizontal axis. In this case, assuming that $\Delta n$ is a refractive index anisotropy of the liquid crystal layer with respect to transmitted light and d is a layer thickness of the liquid crystal layer through which the light is transmitted, it is preferable to set a product $\Delta n \cdot d$ of these values to fall within a range of 380 nm to 480 nm. Additionally, it is desirable that color filters having a plurality of colors which selectively transmit different wavelength lights therethrough are arranged in accordance with each pixel portion facing each electrode of the first and second substrates, and a liquid crystal layer thickness is set to different values in accordance with the respective pixel portions corresponding to the color filters having different colors. As a result, there can be obtained a liquid crystal display device with a high display quality which assuredly prevents tone reversal in an intermediate tone from occurring with higher contrast.

Further, it is preferable to provide a configuration further including a pair of viewing angle compensating films formed of discotic liquid crystal layers arranged between the first polarizing plate and the first substrate and between the second polarizing plate and the second substrate in such a manner that their respective optical axes become parallel with the third direction and opposite to each other. As a result, high contrast can be obtained, an effect of suppressing tone reversal in an intermediate tone can be acquired, and a viewing angle restricting effect which avoids peek can be procured.

Furthermore, in the liquid crystal display device according to the present invention, it is preferable to further include a pair of viewing angle compensating films formed of discotic liquid crystal layers arranged between the first polarizing plate and the first substrate and between the second polarizing plate and the second substrate in such a manner that their respective optical axes become substantially parallel with directions of aligning treatment processing applied to the aligning films of respective adjacent substrates. In this case, it is preferable that a product $\Delta n \cdot d$ of a refractive index anisotropy $\Delta n$ of the liquid crystal layer with respect to light transmitted therethrough and a layer thickness d falls within a range of 450 nm to 550 nm. As a result, high contrast and an effect of suppressing tone reversal in an intermediate tone can be obtained, and a wide viewing angle can be acquired.

Moreover, it is preferable to provide a configuration further including a pair of retardation plates arranged between the first polarizing plate and the viewing angle compensating film adjacent thereto and between the second polarizing plate and the viewing angle compensating film adjacent thereto in such a manner that an optical axis of one of a phase advancing axis and a phase delaying axis becomes substantially parallel with a direction of the optical axis of each adjacent viewing angle compensating film. In this case, assuming that $\Delta n$ is a refractive index anisotropy of the liquid crystal layer and d is a layer thickness of the liquid crystal layer through which the light is transmitted, it is desirable that a product $\Delta n \cdot d$ of these values is set to fall within a range of 350 nm to 450 nm and that retardation Re of the pair of retardation plates is set to fall within a range of 15 nm to 55 nm. Additionally, it is desirable that each of the first and second substrates is formed of a rectangular substrate and each of the first and second aligning films is subjected to aligning treatment in a direction of substantially 45° with respect to one side of the rectangular substrate. As a result, desired high contrast and an effect of suppressing tone reversal in an intermediate tone can be obtained, and an excellent display quality with a wide viewing angle can be acquired.

Further, like the liquid crystal display device according to the second aspect of the present invention, in case of the liquid crystal display device including the discotic liquid crystal layers arranged between the first polarizing plate and the first substrate and between the second polarizing plate and the second substrate in such a manner that their optical axes become substantially parallel with the direction of the aligning treatment processing applied to each of the aligning films of the respective adjacent substrates, it is preferable to arrange the first polarizing plate in such a manner that its optical axis matches with a third direction rotated from the aligning treatment direction of one of the first and second aligning films toward the aligning treatment direction of the other one at an angle which is substantially ½ of an angle formed between the aligning treatment direction of the first aligning film and the aligning treatment direction of the second aligning film. Furthermore, assuming that $\Delta n$ is a refractive index anisotropy of the liquid crystal layer with respect to light transmitted therethrough and d is a layer thickness of the liquid crystal layer through which the light is transmitted, it is desirable to set a product $\Delta n \cdot d$ of these values to fall within a range of 450 nm to 550 nm. Moreover, it is desirable that each of the first and second substrates is formed of a rectangular substrate having upper and lower sides extending in a lateral direction and right and left sides extending in a vertical direction as seen from an observation side, and that each of the first and second aligning films is subjected to aligning treatment in a direction of substantially 45° with respect to a horizontal axis parallel with the upper and lower sides of the rectangular substrate. As a result, desired high contrast and an effect of suppressing tone reversal in an intermediate tone can be obtained, and a very excellent display quality with a wider viewing angle can be acquired.

Additionally, like the liquid crystal display device according to the third aspect of the present invention, in a liquid crystal display device including: a pair of viewing angle compensating films formed of discotic liquid crystal layers arranged between the first polarizing plate and the first substrate and between the second polarizing plate and the second substrate in such a manner that their respective optical axes become substantially parallel with directions of the aligning treatment processing applied to the aligning films of the respective adjacent substrates; and a pair of retardation plates arranged between the first polarizing plate and the viewing angle compensating film adjacent thereto and between the second polarizing plate and the viewing angle compensating film adjacent thereto in such a manner that an optical axis of one of a phase advancing axis and a phase delaying axis becomes substantially parallel with a direction of an optical axis of each adjacent viewing angle compensating film, it is desirable that each of the first and second substrates is formed of a rectangular substrate and aligning treatment is applied to each of the first and second aligning films in a direction of substantially 45° with respect to one side of the rectangular substrate. Assuming that $\Delta n$ is a refractive index anisotropy of the liquid crystal layer and d is a layer thickness of the liquid crystal layer through which the light is transmitted, it is desirable to set a product $\Delta n \cdot d$ of these values to fall within a range of 350 nm to 450 nm and set retardation Re of the pair of retardation plates to 15 nm to 55 nm.

Further, it is preferable that color filters having a plurality of colors through which different wavelength lights are selectively transmitted are respectively arranged in accordance with each pixel portion facing each electrode of the first and second substrates, and a liquid crystal layer thickness is set to different values in accordance with the respective pixel portions corresponding to the color filters having the different colors. As a result, desired high contract, an effect of suppressing tone reversal in an intermediate tone and viewing angle characteristics can be obtained, and an excellent color display quality superior in color reproducibility can be acquired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A and 3B are views illustrating an alignment state of liquid crystal molecules at the time of off where an electric field is not applied in the liquid crystal display device, in which FIG. 3A is a plan view and FIG. 3B is a cross-sectional view;

FIGS. 4A and 4B are views illustrating an alignment state of liquid crystal molecules at the time of on where an electric field is applied in the liquid crystal display device, in which FIG. 4A is a plan view and FIG. 4B is a cross-sectional view;

DETAILED DESCRIPTION OF THE INVENTION (First Embodiment)

Figure 1:
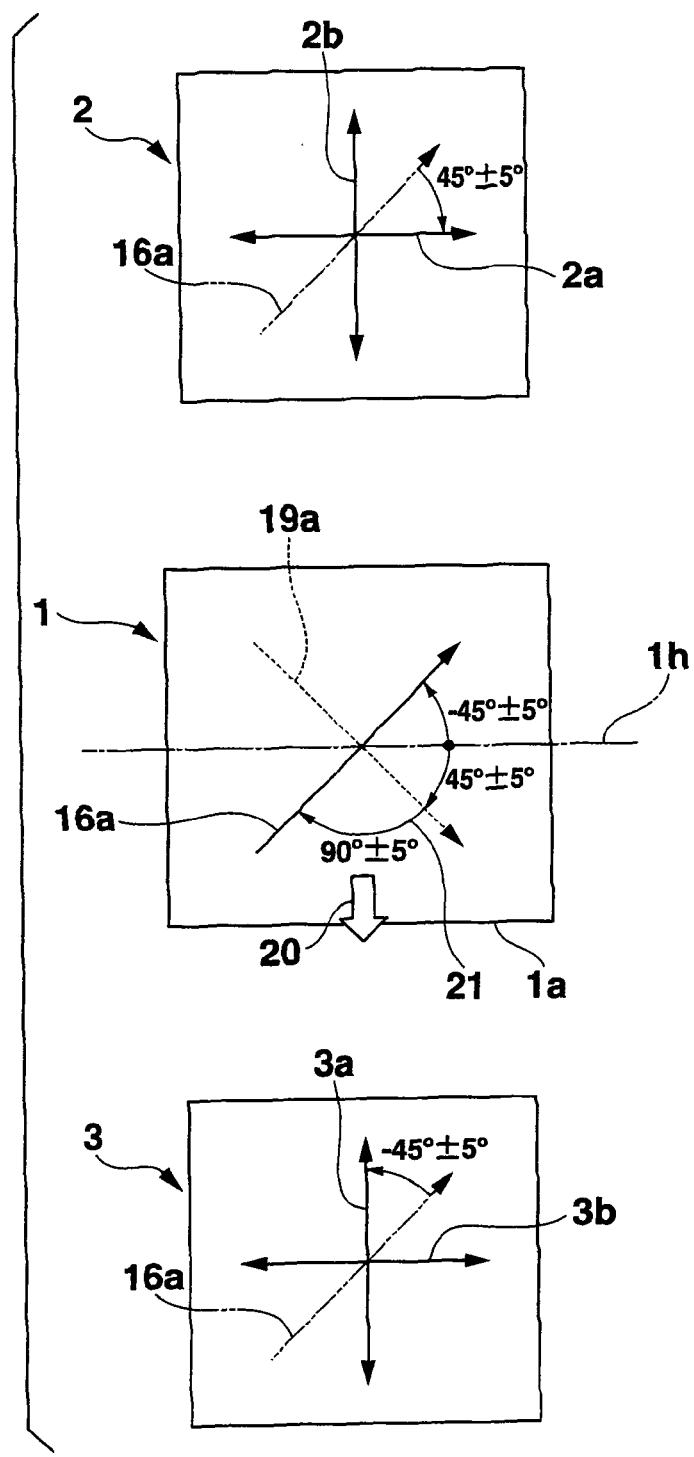
FIG. 1 is an exploded plan view showing a liquid crystal display device as a first embodiment of the present invention.
Figure 2:
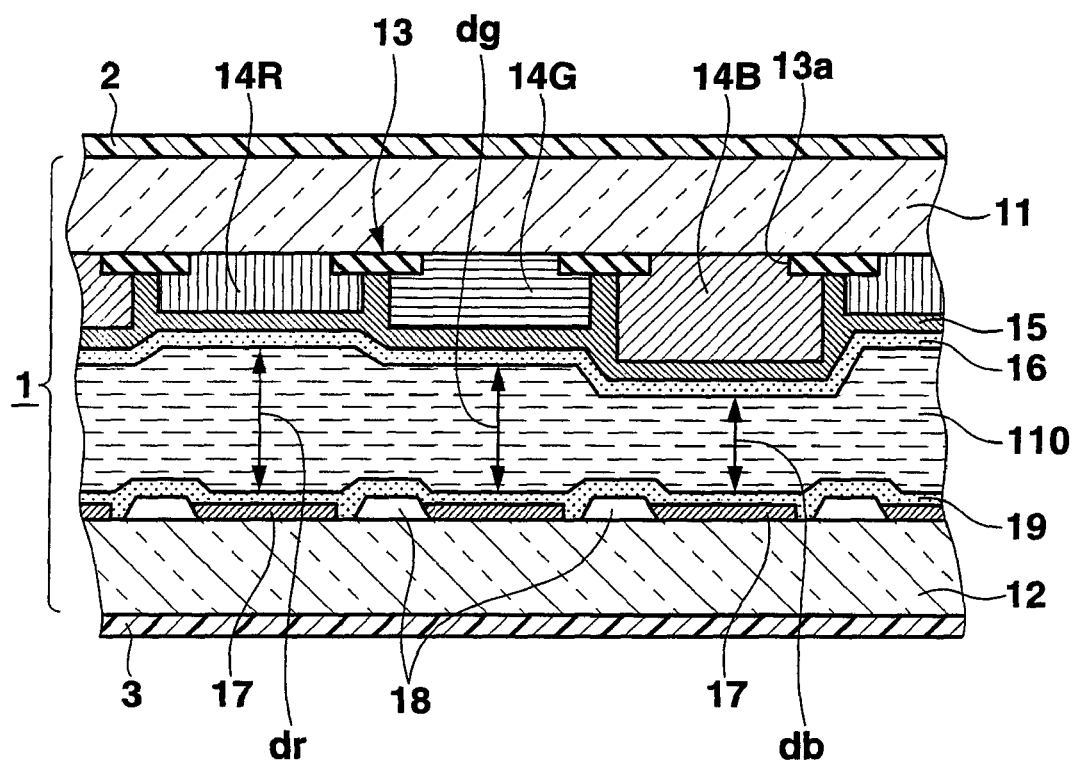
FIG. 2 is a partially enlarged schematic cross-sectional view showing an internal configuration of the liquid crystal display device.

FIG. 1 is an exploded plan view showing an optical configuration of a liquid crystal display device as a first embodiment of the present invention, and FIG. 2 is a schematic cross-sectional view showing an internal configuration of this element in an enlarging manner.

A liquid crystal display device according to this embodiment is an active matrix type liquid crystal display device, and constituted of a liquid crystal cell 1 having a rectangular plane outer shape which has first sides 1a parallel with a horizontal axis 1h in a lateral direction of the liquid crystal display device and second sides parallel with a vertical direction perpendicular to this horizontal axis 1h as seen from an observation side. The display elements 1 includes rectangular front and rear polarizing plates 2 and 3 which are respectively set on a front side as the observation side of display and a rear side with the liquid crystal cell 1 therebetween as shown in FIG. 1.

In the liquid crystal cell 1, as shown in FIG. 2, a pair of front and rear glass substrates 11 and 12 are joined while maintaining a predetermined gap therebetween by a frame-shaped sealing material (not shown). A black mask 13 having an opening 13a corresponding to each pixel region is set on an opposed surface (an inner surface) of the front glass substrate 11 which is one of the pair of joined glass substrates 11 and 12. In the black mask 13, the plurality of openings 13a corresponding to respective pixels are formed in a matrix arrangement.

Three types of color filters 14R, 14G and 14B of red, green and blue are respectively set on a surface of the front glass substrate 11 facing the rear glass substrate 12 in a predetermined arrangement in accordance with each of the respective openings 13a of the black mask 13. Each of these color filters 14R, 14G and 14B has an area larger than each opening 13a by an appropriate length and width over the entire circumference, and is set in such a manner that its rim portion overlaps an opening edge portion of the black mask 13. Further, a thickness of each of the color filters 14R, 14G and 14B is optimally set in accordance with each of the color filters 14R, 14G and 14B in such a manner that a liquid crystal layer thickness (a cell gap) dr, dg or db in each pixel region where each of the color filters 14R, 14G and 14B is arranged substantially matches with a value of a product of a refractive index anisotropy of the liquid crystal layer in accordance with transmission light having each wavelength and the layer thickness dr, dg or db. This optimization of the liquid crystal layer thickness will be described later in detail.

A common electrode 15 formed of one film type transparent electroconductive film covers surfaces of the color filters 14R, 14G and 14B of red, green and blue having different thicknesses. Furthermore, a front homogeneous alignment film 16 which restricts alignment of liquid crystal molecules uniformly covers a surface of the common electrode 15. As shown in FIG. 1, a surface of this front homogeneous alignment film 16 is subjected to aligning treatment in a direction of an arrow 16a by a rubbing method. This aligning treatment direction 16a is a direction which crosses the horizontal direction 1h which is parallel with the lower side 1a on a display surface forming the rectangular shape of the liquid crystal cell 1 in an upper right direction at an angle of −45°±5° (a clockwise direction is determined as a + direction).

A plurality of pixel electrodes 17 formed of a transparent electroconductive film are set on an inner surface of the rear glass plate 12 in a matrix arrangement in accordance with the openings 13a of the black mask 13. A thin film transistor 18 as an active element is electrically connected with each pixel electrode 17. Furthermore, a rear homogeneous alignment film 19 is uniformly provided to cover all the pixel electrodes 17, thin film transistors 18 and others. As shown in FIG. 1, this rear homogeneous alignment film 19 is subjected to aligning treatment in a direction indicated by an arrow 19a perpendicular to the aligning treatment direction 16a of the front homogeneous alignment film 16 by the rubbing method. This aligning treatment direction 19a is a direction which crosses the horizontal axis 1h of the liquid crystal cell 1 in a lower right direction at an angle of +45°±5°.

A liquid crystal layer 110 is sealed in a space formed when the front and rear homogeneous alignment films 16 and 19 attached on the respective inner surfaces of the two glass substrates 11 and 12 face each other. The sealed liquid crystal layer 110 is formed of a nematic liquid crystal having a positive dielectric anisotropy. In an initial state where no electric field is applied, respective liquid crystal molecules in the vicinity of the front and rear homogeneous alignment films 16 and 19 are arranged upon undergoing an alignment restricting force along the directions 16a and 19a of the aligning treatment applied to the front and rear horizontal alignment films 16 and 19, and the liquid crystal molecules in the liquid crystal layer are twist-aligned between the two glass substrates 11 and 12.

That is, the respective liquid crystal molecules in the sealed liquid crystal layer 110 are arranged in a twisted state at an angle of 90°±5° in a clockwise direction indicated by an arrow 21 from the surface of the rear homogeneous alignment film 19 toward the surface of the front homogeneous alignment film 16. Therefore, there exists a visual angle direction along which the best contrast can be obtained in this liquid crystal display device in a direction which is rotated clockwise from the aligning treatment direction 19a of the rear homogeneous alignment film 19 at an angle of 45° and indicated by an outline arrow 20 (a direction of an intermediate angle in a twist angle range), i.e., a downward direction in the figure which is indicated by this outline arrow direction 20.

The liquid crystal layer 110 in which the liquid crystal molecules are twist-aligned as described above has wavelength dependence that the refractive index anisotropy varies depending on a wavelength of light transmitted therethrough. Therefore, in order to perform color display with high color reproducibility, a liquid crystal layer thickness which differs in accordance with a pixel of each color is set in such a manner that a birefringence effect of substantially λ/2 is given to each of red, green and blue wavelength lights transmitted through the liquid crystal layer 110.

That is, in the liquid crystal cell 1 according to this embodiment, a layer thickness dr, dg or db for each pixel of red, green or blue is set to a value which offsets the wavelength dependence of a refractive index anisotropy Δn with respect to each wavelength light.

That is, ratios of a refractive index anisotropy Δnb with respect to blue wavelength light, a refractive index anisotropy Δng with respect to green wavelength light and a refractive index anisotropy Δnr with respect to red wavelength light are as follows:

$$\Delta nb/\Delta ng = 1.04 \pm 0.03$$

$$\Delta nr/\Delta ng = 0.96 \pm 0.03$$

In accordance with the above-described expression, as shown in FIG. 2, a film thickness of each of the color filters 14R, 14G and 14B is set in such a manner that the liquid crystal layer thickness dr of a pixel having the red color filter 14R arranged therein becomes 5.5 μm, the liquid crystal layer thickness dg of a pixel having the green color filter 14G arranged therein becomes 5.0 μm and the liquid crystal layer thickness db of a pixel having the blue color filter 14B arranged therein becomes 4.8 μm.

A front polarizing plate 2 is set on an outer surface of the front glass substrate 11 of the liquid crystal cell 1. As shown in FIG. 1, this front polarizing plate 2 is set in such a manner that its transmission axis 2a is placed in parallel with the horizontal axis 1h of the display surface as seen from the observation side. Therefore, the transmission axis 2a crosses the direction 16a of the aligning treatment applied to the front homogeneous alignment film 16 of the liquid crystal cell 1 at an angle of +45°±5°.

Furthermore, a rear polarizing plate 3 is set on an outer surface of the rear glass substrate 12 of the liquid crystal cell 1. This rear polarizing plate 3 is set in such a manner that its transmission axis 3a becomes perpendicular to the transmission axis 2a of the front polarizing plate 2, i.e., parallel with a vertical direction of the display surface (a direction perpendicular to the horizontal axis 1h of the liquid crystal display device as seen from the observation side, which will be referred to as a vertical axis direction hereinafter). Therefore, the transmission axis 3a crosses the direction 16a of the aligning treatment applied to the front homogeneous alignment film 16 of the liquid crystal cell 1 at an angle of −45°±5°.

That is, the front polarizing plate 2 is arranged in such a manner that its transmission axis 2a faces a direction perpendicular to a direction of an intermediate angle (a direction indicated by the outline arrow 20) in a twist angle range in which the liquid crystal molecules in the liquid crystal layer are twist-aligned from the front homogeneous alignment film 16 toward the rear homogeneous alignment film 19 and that an absorption axis 2b perpendicular to the transmission axis 2a substantially matches with the direction of the intermediate angle. Moreover, the rear polarizing plate 3 is arranged in such a manner that its transmission axis 3a faces a direction substantially parallel with the direction of the intermediate angle (the direction indicated by the outline arrow 20) in the twist angle range in which the liquid crystal molecules in the liquid crystal layer are twist-aligned from the front homogeneous alignment film 16 toward the rear homogeneous alignment film 19 and that an absorption axis 3b perpendicular to the transmission axis 3a becomes substantially perpendicular to the direction of the intermediate angle and substantially perpendicular to the absorption axis 2b of the front polarizing plate 2.

That is, the front polarizing plate 2 is arranged in such a manner that its transmission axis 2a or absorption axis 2b matches with the direction indicated by the arrow 20 rotated from one of the aligning treatment directions 16a and 19a of the front and rear aligning films 16 and 19 toward the other one at an angle (45°) which is substantially ½ of an angle formed between the aligning treatment direction 16a of the front aligning film 16 and the aligning treatment direction 19a of the rear aligning film 19.

Figure 3A:
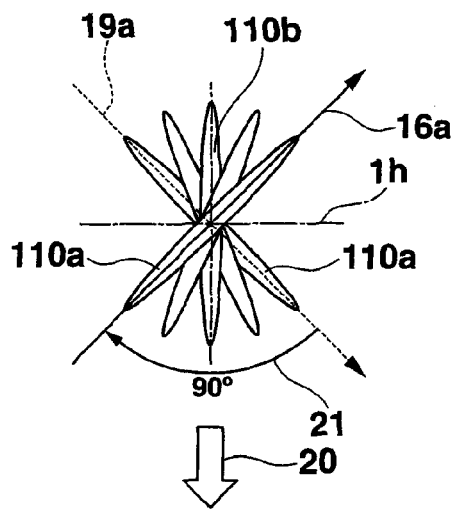
Figure 3B:
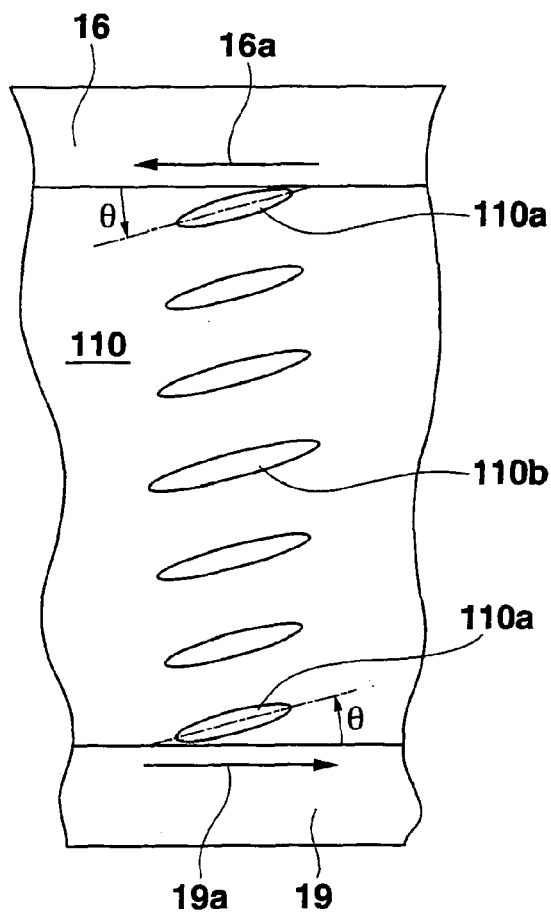
Figure 4A:
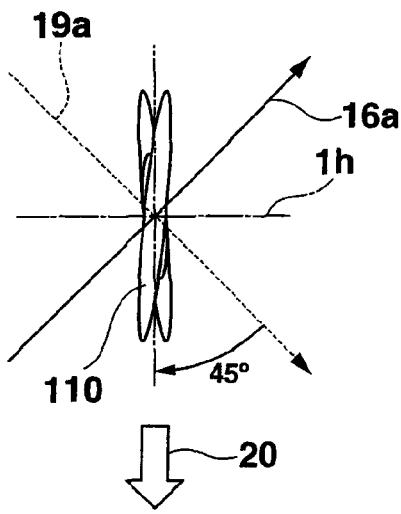
Figure 4B:
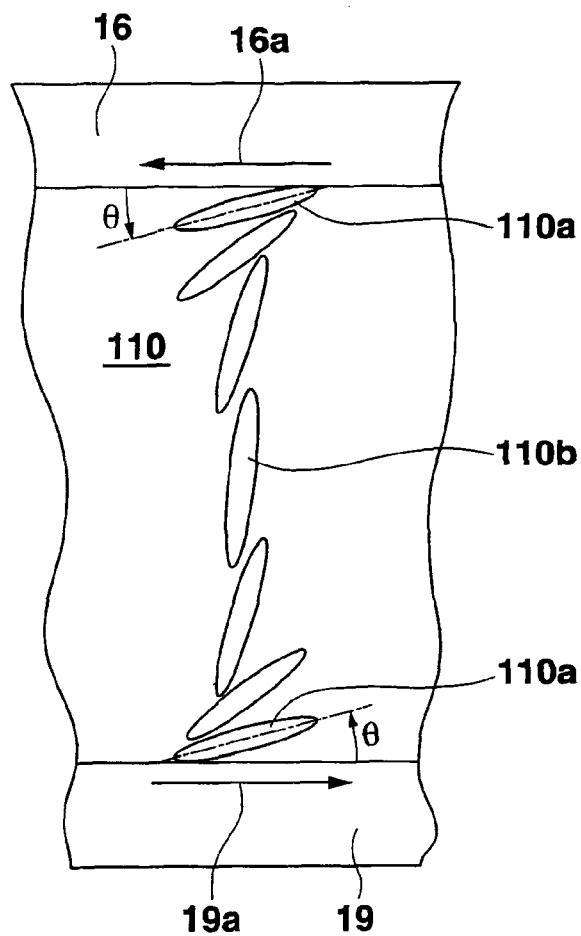

Functions and effects of the thus configured liquid crystal display device will now be described with reference to schematic explanatory figures of FIGS. 3 and 4. Here, FIGS. 3A and 3B show an initial alignment state of the liquid crystal molecules when no electric field is applied to the liquid crystal layer. FIG. 3A is a plan view, and FIG. 3B is a cross-sectional view showing an alignment state of the liquid crystal molecules between the substrates. Moreover, FIGS. 4A and 4B show a state in which a sufficiently large electric field is applied to the liquid crystal layer to rise the liquid crystal molecules. FIG. 4A is a plan view, and FIG. 4B is a cross-sectional view showing an alignment state of the liquid crystal molecules between the substrates.

In the initial alignment state depicted in FIGS. 3A and 3B, each liquid crystal molecule 110a in the vicinity of the front and rear aligning films 16 and 19 undergoes an alignment restricting force of the corresponding homogeneous alignment films 16 and 19 and is aligned in an attitude that its long axis direction is parallel with each of the aligning treatment directions 16a and 19a and an end portion on the downstream side of each of the aligning treatment directions 16a and 19a is lifted at a pre-tilt angle θ. Each intermediate liquid crystal molecule 110b in the liquid crystal layer 110 is twist-aligned continuously with alignment of each liquid crystal molecule 110a in the vicinity of each of the homogeneous alignment films 16 and 19 between the two substrates. That is, the liquid crystal molecules 110a and 110b are in twist-aligned in a range of substantially 90° extending clockwise in a direction of an arrow 21 from the rear homogeneous alignment film 19 side toward the front homogeneous alignment film 16 side. The liquid crystal layer 110 in which the liquid crystal molecules 110a and 110b are twist-aligned in the range of 90 degrees is set to have birefringence which generates a retardation which is ½ of a wavelength λ of transmitted light.

Therefore, linear polarized light transmitted through this liquid crystal layer 110 exits as linear polarized light having a polarization plane optically rotated at 90°.

In this liquid crystal display device, as shown in FIG. 1, since the transmission axis 3a of the rear polarizing plate 3 is perpendicular to the transmission axis 2a of the front polarizing plate 2, the respective absorption axes 3b and 2b are also arranged to be perpendicular to each other. Therefore, illumination light from a backlight 10 (see FIG. 6) is transmitted through the rear polarizing plate 3 so that its polarization plane is turned to linear polarized light parallel with the transmission axis 3a and enters the liquid crystal layer 111 in the initial alignment state. This light is provided with a retardation of $\lambda/2$ when transmitted through this liquid crystal layer 110, and its polarization plane is optically rotated at 90°, and this light then exits. Since the polarization plane of this exiting linear polarized light is parallel with the transmission axis 2a of the front polarizing plate 2, this linear polarized light is transmitted without being absorbed, thereby enabling bright display.

Then, when an electric field which is sufficiently intensive to substantially vertically align the liquid crystal molecules 110b positioned in the intermediate layer of the liquid crystal layer 110 with respect to the substrates is applied to the liquid crystal layer 110 in order to carry out dark display, the alignment state of the liquid crystal molecules becomes as shown in FIGS. 4A and 4B.

Each liquid crystal molecule is standing-aligned in such a manner that its long axis direction becomes parallel with a direction of the applied electric field, i.e., a direction vertical to the front and rear glass substrates 11 and 12 (see FIG. 2), and each liquid crystal molecule 110b positioned in the middle of the liquid crystal layer 110 in the layer thickness direction is substantially vertically aligned in a spiral releasing state. On the other hand, each liquid crystal molecule 110a in the vicinity of the front and rear homogeneous alignment films 16 and 19 cannot sufficiently rise due to an anchoring effect of each corresponding homogeneous alignment film 16 or 19, and an intermolecular force which releases the spiral allows each liquid crystal molecule 110a in the vicinity of each of the homogeneous alignment films 16 and 19 to be aligned in such a manner that the pre-tilt angle θ remains unchanged but the long axis direction faces a direction of an intermediate angle of the twist angel range of the twist alignment, i.e., an angle obtained by dividing an angle formed between the aligning treatment direction 16a of the front aligning film 16 and the aligning treatment direction 19a of the rear aligning film in two, namely, a third direction 20 rotated clockwise at 45° from the aligning treatment direction 19a of the rear aligning film 19 (a direction of a vertical line of the liquid crystal display device in the figure).

Further, a rising angle of each liquid crystal molecule 110b is increased as distanced from each of the homogeneous alignment films 16 and 19, and each liquid crystal molecule 110b in the intermediate portion of the liquid crystal layer 110 is aligned in a substantially vertically rising state. As shown in FIG. 4A, in regard to a standing alignment state at the time of application of the electric field (at the time of on), the respective liquid crystal molecules are aligned in a state where their long axis directions are generally aligned in the third direction 20.

In this liquid crystal display device, as shown in FIG. 1, since the rear polarizing plate 3 is arranged in such a manner that its transmission axis 3a is parallel with the third direction 20 in the liquid crystal cell 1, a retardation is not substantially given when linear polarized light transmitted through the rear polarizing plate 3 is transmitted through the liquid crystal layer 110, and this light exits as the substantial linear polarized light without change. Since a direction of the polarization plane of this exiting linear polarized light is a direction parallel with the absorption axis 2b of the front polarizing plate 2, the front polarizing plate 2 assuredly performs absorption, thereby obtaining excellent dark display.

Figure 5:
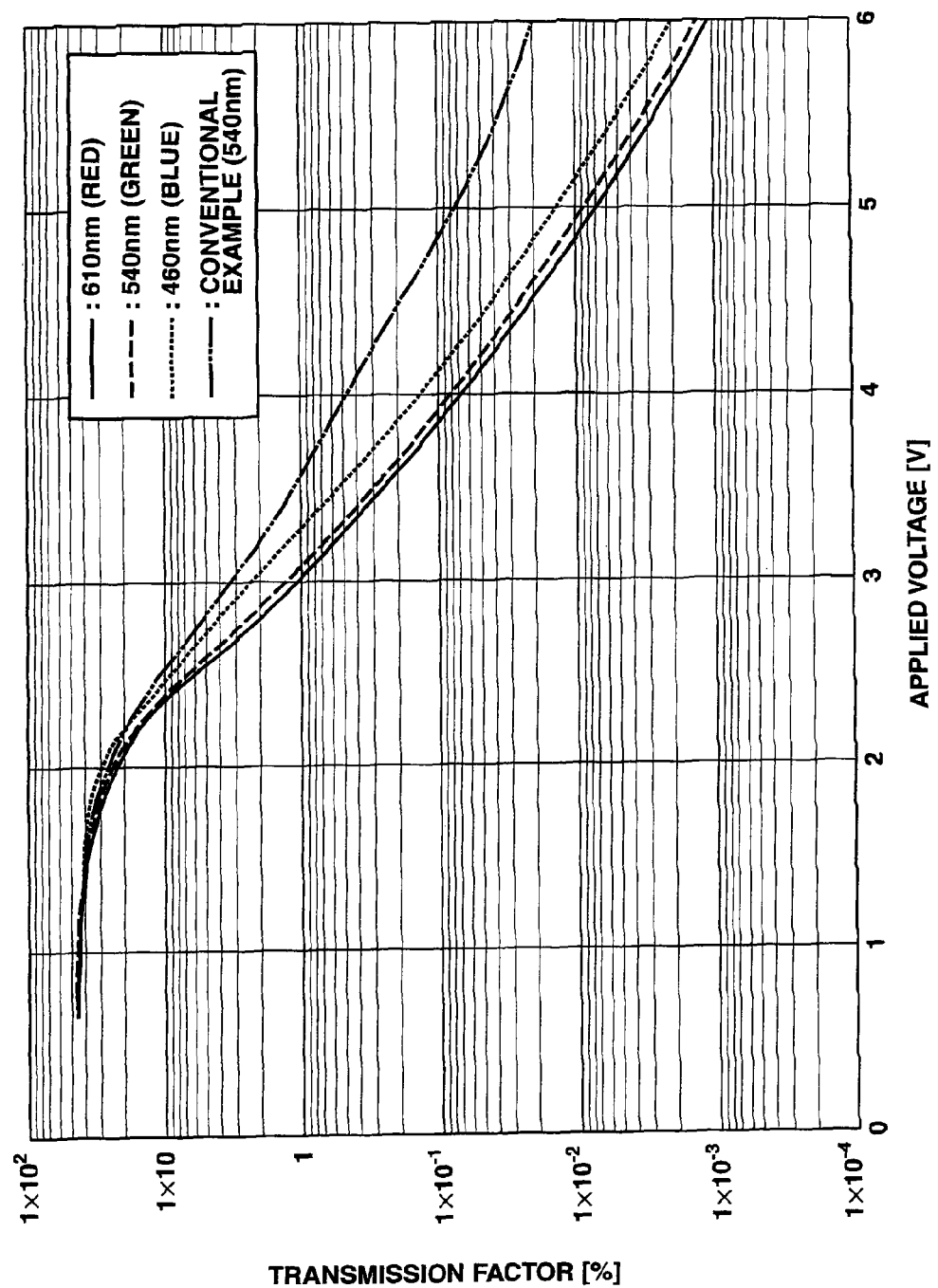
FIG. 5 is a graph showing change characteristics of a transmission factor with respect to an applied voltage in accordance with each wavelength light in the liquid crystal display device.
Figure 13:
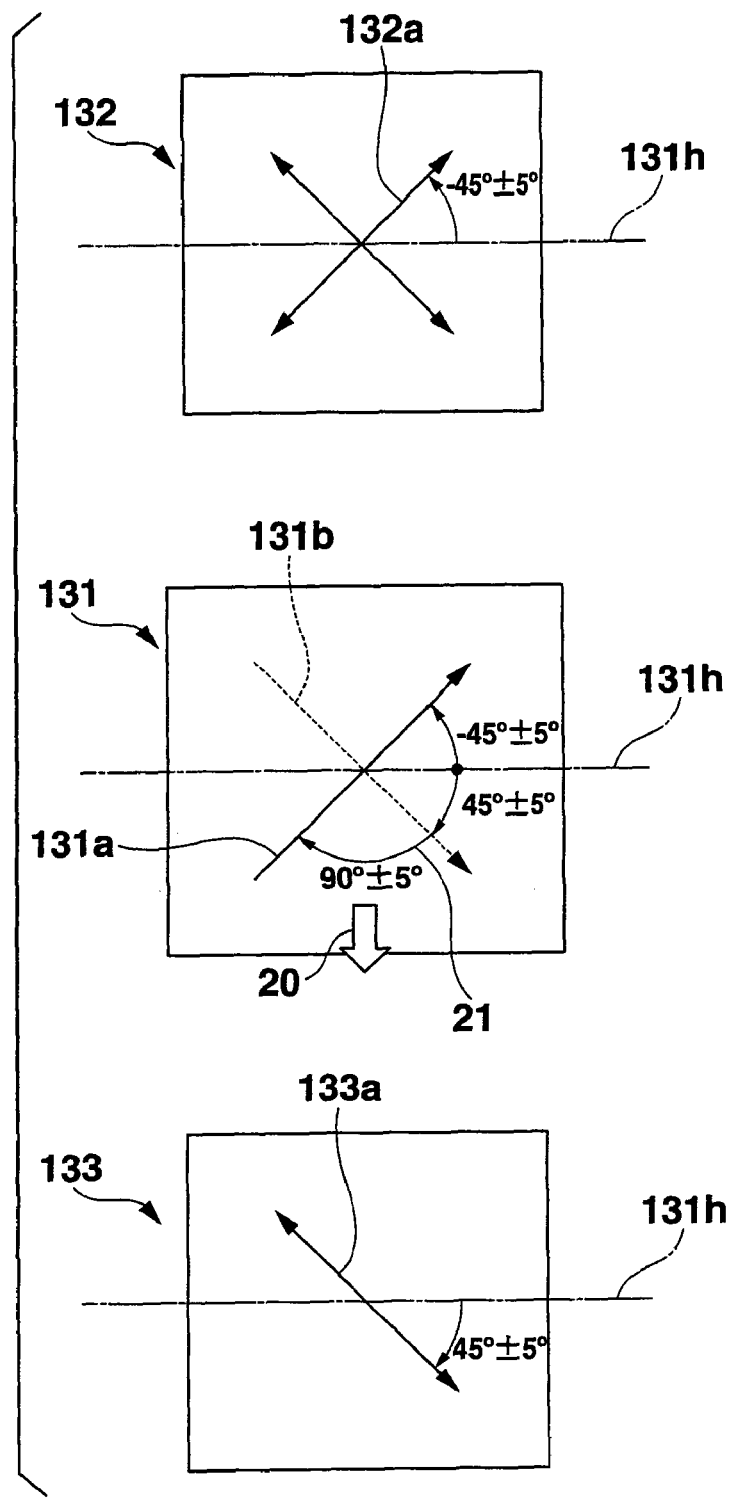
FIG. 13 is an exploded plan view showing a conventional liquid crystal display device.

FIG. 5 is a graph showing a change in transmission factor in accordance with each wavelength light with respect to an applied voltage of this liquid crystal display device, wherein a vertical axis representing a transmission factor is a logarithmic scale. As shown in FIG. 13 as a comparative example, in a conventional TN type liquid crystal display device, a liquid crystal layer is arranged between a pair of substrates facing each other, and front and rear polarizing plates 132 and 133 are arranged on a liquid crystal cell 131 in such a manner that their respective transmission axes 132a and 133a are aligned in the same directions as aligning treatment directions 131a and 131b of corresponding homogeneous alignment films. In the liquid crystal cell 131, the aligning treatment direction 131a of the aligning film formed on the front substrate is set to −45° with respect to a horizontal line 131h of the liquid crystal display device, and the aligning treatment direction 131b of the aligning film formed on the rear substrate is set to 45° with respect to the horizontal line 131h. Transmission factor characteristics of green wavelength light obtained by this conventional TN type liquid crystal display device are indicated by a two-dots dash line in FIG. 5.

As apparent from FIG. 5, in the liquid crystal display device according to this embodiment of the present invention, a transmission factor of the green wavelength light at the time of application of the maximum electric field (at the time of on) where an applied voltage is 4.5 V is 0.02% which is reduced to approximately $\frac{1}{10}$ of 0.2% which is a transmission factor in the conventional example in which the same applied voltage is used, thereby obtaining a low cost of a black level. Consequently contrast is increased approximately tenfold.

Furthermore, in the conventional TN type liquid crystal display device, tone reversal in an intermediate tone occurs in a direction matching with a long axis direction of each liquid crystal molecule. However, in the liquid crystal display device according to the embodiment of the present invention, since the transmission axis 3a of the rear polarizing plate 3 matches with the third direction 20 as described above, occurrence of tone reversal in the intermediate tone along the third direction is suppressed.

As described above, in the liquid crystal display device according to this embodiment, the front polarizing plate 2 and the rear polarizing plate 3 are respectively arranged on front and rear sides with the liquid crystal cell 1 in which the liquid crystal molecules are twist-aligned at the angle of 90° therebetween in such a manner that their respective transmission axes 2a and 3a become perpendicular to each other, and the transmission axis 3a of the rear polarizing plate 3 to which light from the backlight enters is arranged to match with the third direction which is a direction of the intermediate angle in the angle range in which the liquid crystal molecules are twist-aligned. Therefore, at the time of on where an electric field is sufficiently applied, the third direction along which the liquid crystal molecules in the vicinity of the aligning films are arranged becomes substantially parallel with the optical axis constituted of the absorption axis or the transmission axis of the polarizing plate. Therefore, excellent dark display with a sufficiently low transmission factor can be obtained, thereby improving contrast of display.

Moreover, Δn·d for each pixel in which each of the color filters 14R, 14G and 14B of red, green and blue is provided is calculated based on an expression ($\sqrt{3}\cdot\lambda/2$) representing a value of retardation required to rotate the polarization plane of transmitted light at 90° while considering an twist effect caused by twist alignment of the liquid crystal molecules. This value is appropriately set within a range of 380 nm to 480 nm in accordance with each pixel corresponding to each color filter, thereby providing a multigap structure having each liquid crystal layer thickness. Therefore, excellent dark display with a sufficiently low transmission factor and high contrast can be obtained with respect to light of wavelength of all colors. As a result, it is possible to acquire a white color having a good chromaticity and high-grade color display with excellent color reproducibility based on this white color.

In this embodiment, the rear polarizing plate 3 may be arranged in such a manner that its absorption axis 3b becomes parallel with the third direction 20. In this case, the front polarizing plate 2 is arranged in such a manner that its absorption axis 2b crosses the aligning treatment direction 16a at an angle of 45°±5°. Even if such an optical axis arrangement configuration is adopted, the above-described desirable effect can be likewise demonstrated.

(Second Embodiment)

A second embodiment according to the present invention will now be described with reference to FIGS. 6 and 7. In this embodiment, like reference numerals denote constituent parts equal to those in the first embodiment, thereby eliminating their explanation.

A liquid crystal display device according to this embodiment has a configuration in which a front viewing angle compensating film 4 is set between a liquid crystal cell 1 and a front polarizing plate 2 and a rear viewing angle compensating film 5 is set between the liquid crystal cell 1 and a rear polarizing plate 3 in addition to the configuration of the liquid crystal display device according to the first embodiment. A multigap structure of the liquid crystal cell 1 is the same as that in the first embodiment, and $\Delta n \cdot d$ of each of red, green and blue pixels is appropriate set in a range of 380 nm to 480 nm.

Figure 7:
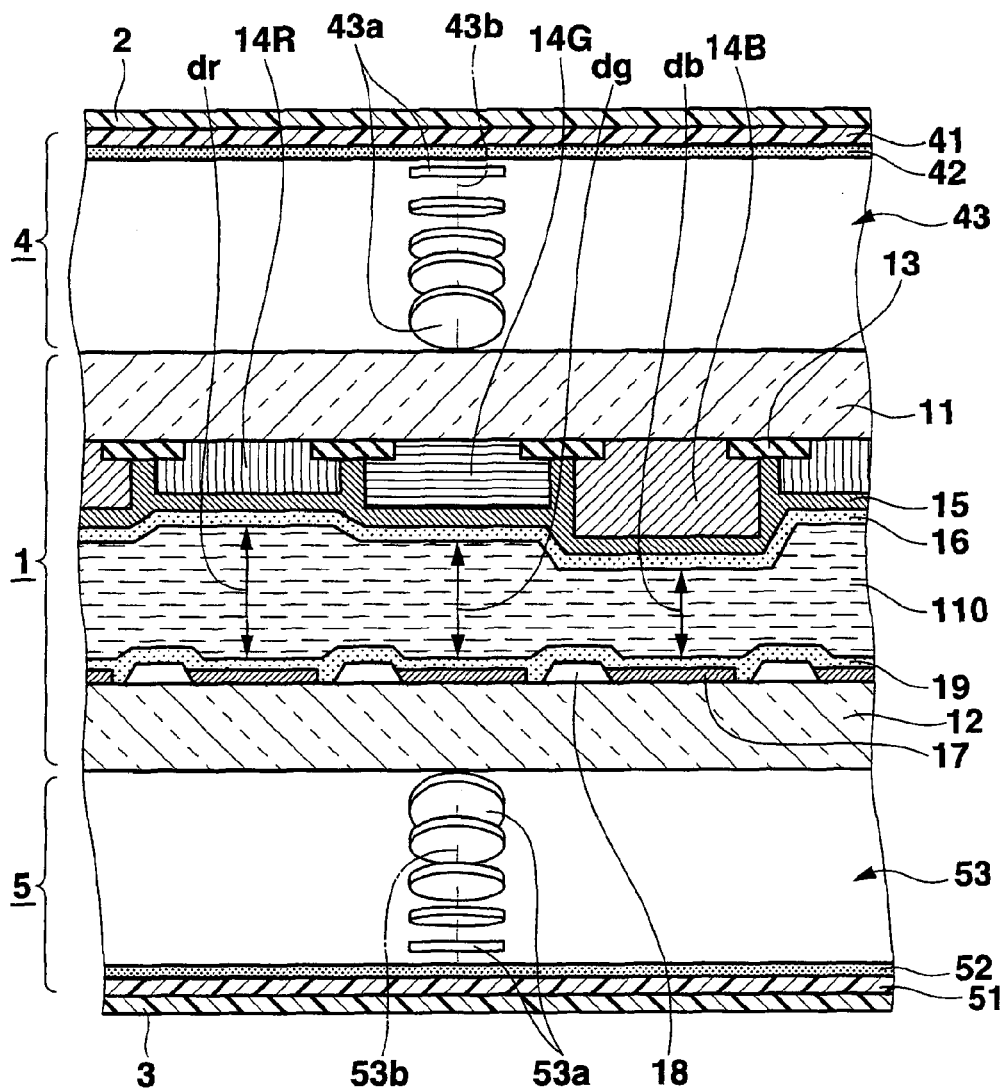
FIG. 7 is a partially enlarged schematic cross-sectional view showing an internal configuration of the liquid crystal display device.

As shown in FIG. 7, the viewing angle compensating films 4 and 5 are obtained by forming aligning films 42 and 52 on one surface of transparent film substrates 41 and 51 and superimposing discotic liquid crystal layer 43 and 53 on surfaces of these aligning films 42 and 52. In each of the discotic liquid crystal layers 43 and 53, discotic liquid crystal molecules 43a and 53a each having a discoid shape are arranged in a state where they are inclined in one direction while continuously changing individual angles with molecular axes 43b and 43b vertical to a disc surface of each liquid crystal molecule being aligned in a predetermined direction. A direction of each of molecular axes 43b and 53b is parallel with a direction of aligning treatment applied to each of the aligning films 42 and 52. The discotic liquid crystal molecules 43a and 53a which are in close proximity to the aligning films 42 and 52 are aligned in such a manner that their disc surfaces become substantially parallel with the film substrates 41 and 51, and an inclination angle, i.e., a tilt angle of a molecular disc surface of each of the discotic liquid crystal molecules 43a and 53a apart from the surfaces of the aligning films 42 and 52 with respect to each of the film substrates 41 and 51 is increased as distanced from the respective aligning films. As a result, the discotic liquid crystal layers 43 and 53 develop a negative optical anisotropy in which an optical axis along which a refractive index becomes minimum (which will be referred to as an alignment axis hereinafter) is provided in a direction along which the inclination angles of the molecular axes 43b and 53b of the respective discotic liquid crystal molecules 43a and 53a are averaged.

Figure 6:
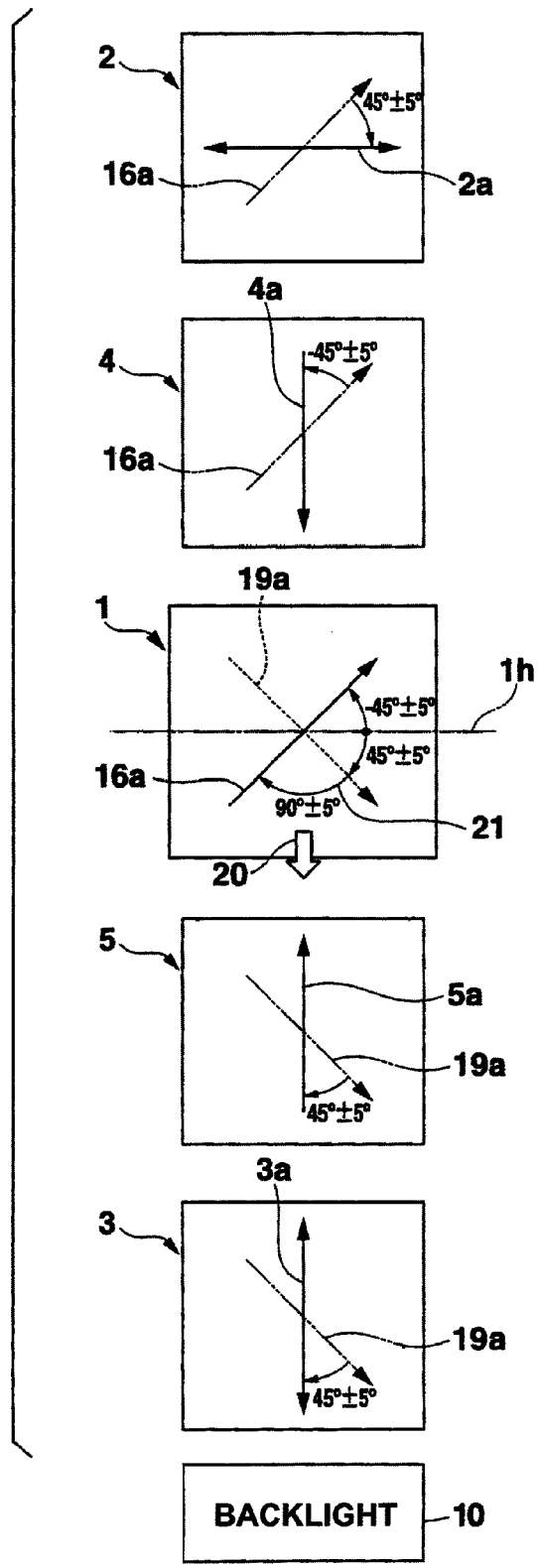
FIG. 6 is an exploded plan view showing a liquid crystal display device as a second embodiment of the present invention.

In this embodiment, as shown in FIG. 6, the viewing angle compensating films 4 and 5 are set on front and rear sides with the liquid crystal cell 1 therebetween in such manner that the respective alignment axes 4a and 5a become parallel with a third direction 20 of the liquid crystal cell 1 and opposite to each other. That is, a direction of the alignment axis 4a of the front viewing angle compensating film 4 matches with an upper direction in a vertical direction of the liquid crystal display device, and a direction of the alignment axis 5a of the rear viewing angle compensating film 5 matches with a lower direction of the same.

Figure 8:
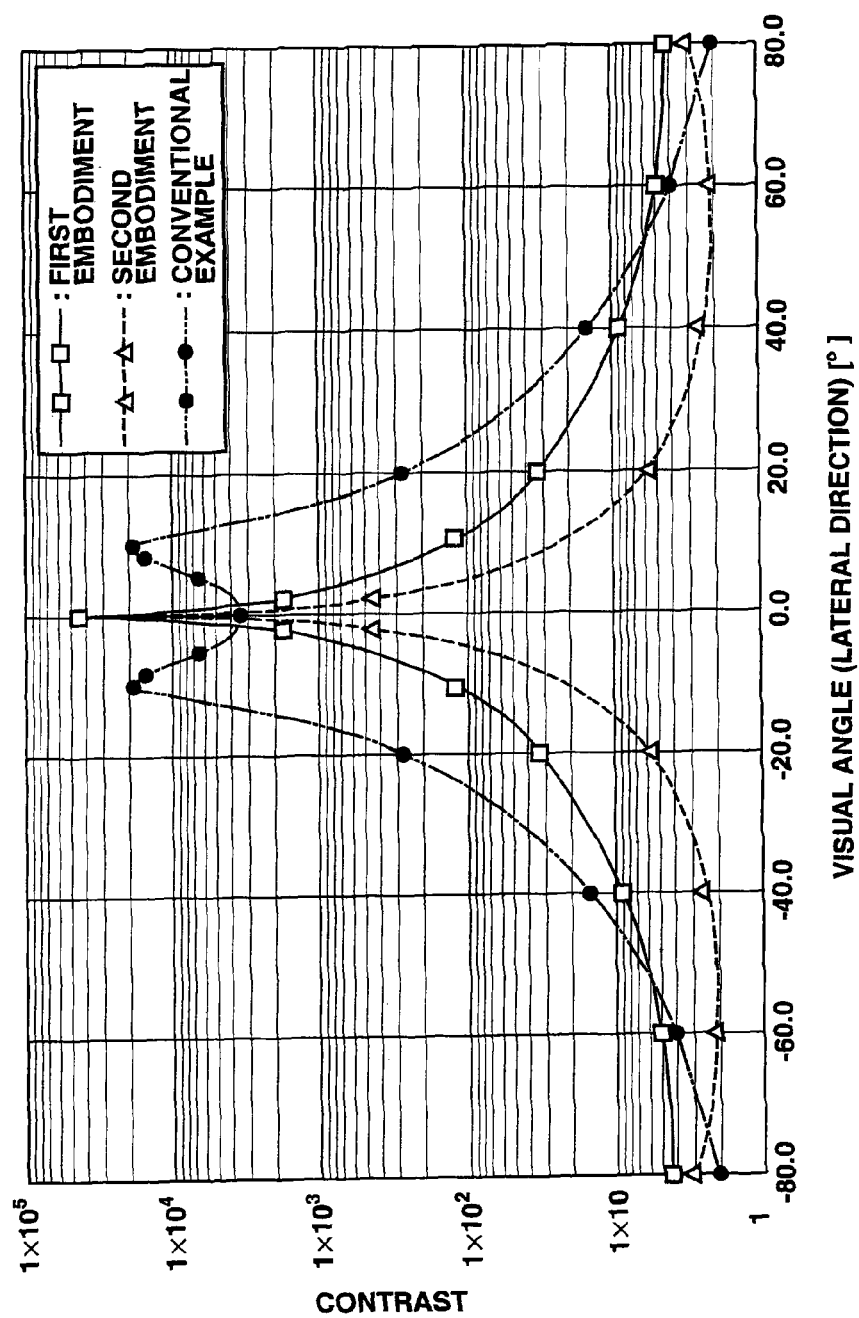
FIG. 8 is a graph showing viewing angle characteristics in a lateral direction in the liquid crystal display device according to the second embodiment.

In the thus configured liquid crystal display device according to this embodiment, as shown in FIG. 8, contrast in a lateral viewing angle direction of the liquid crystal display device is suddenly reduced as the viewing angle is inclined. That is, comparing with a viewing angle at which contrast is not greater than 10, a viewing angle on both right and left sides is not smaller than 45° in the liquid crystal display device having the conventional configuration shown in FIG. 13, whereas a viewing angle on both right and left sides is very small as 15° or above in the liquid crystal display device according to this embodiment. This is much smaller than approximately 37° which is a viewing angle of the liquid crystal display device according to the first embodiment. In regard to contrast in a front direction, high contrast equivalent to that of the liquid crystal display device according to the first embodiment is obtained.

Therefore, according to the liquid crystal display device of the second embodiment, since a viewing angle in a lateral viewing angle direction is considerably narrowed, it is possible to obtain a useful effect of effectively preventing peep by people other than an observer as well as a color reproducibility acquired by the liquid crystal display device according to the first embodiment.

The directions of the respective alignment axes 4a and 5a of the viewing angle compensating films 4 and 5 may be reversed from the above-described directions. That is, even if the direction of the alignment axis 4a of the viewing angle compensating film 4 is determined as the upper direction and the direction of the alignment axis 5a of the viewing angle compensating film 5 is determined as the lower direction, the obtained effect remains unchanged.

(Third Embodiment)

A liquid crystal display device according to a third embodiment has a multigap structure of a liquid crystal cell 1 in the liquid crystal display device according to the second embodiment, but $\Delta n \cdot d$ of each of red, green and blue pixels is appropriately set in a range of 450 nm to 550 nm and arrangement directions of alignment axes 6a and 7a of viewing angle compensating films 6 and 7 are changed.

Figure 9:
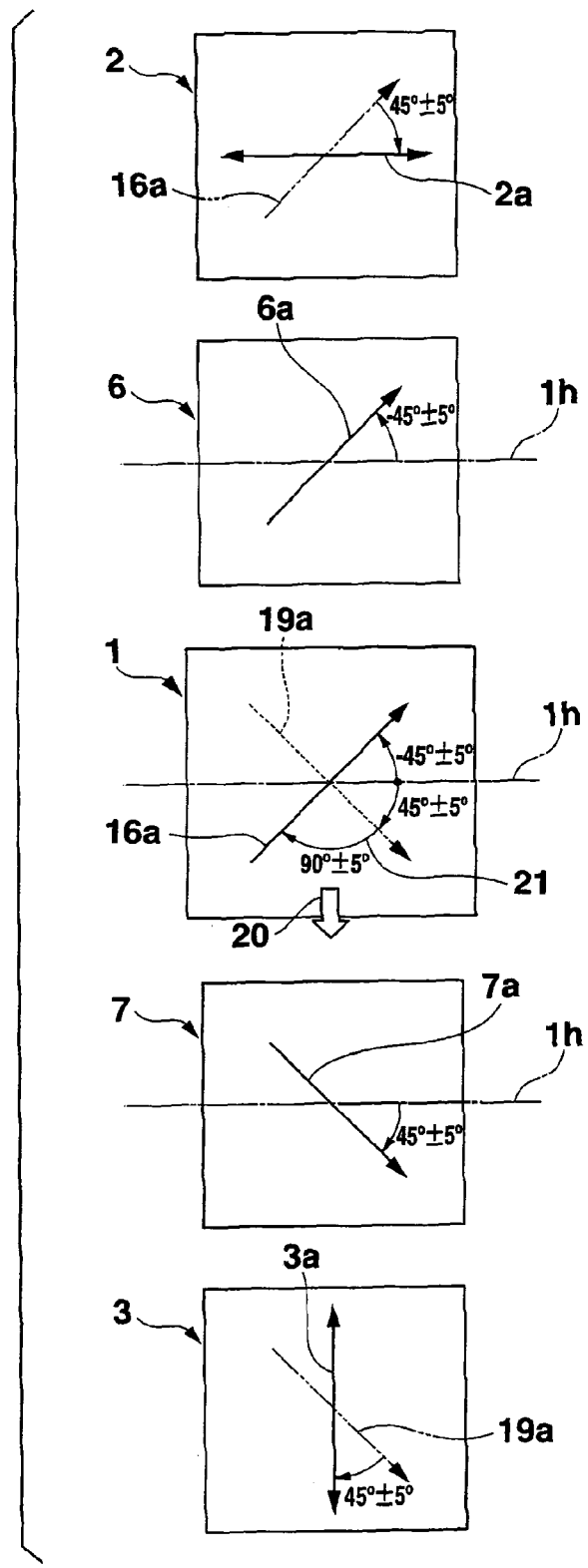
FIG. 9 is an exploded plan view showing a liquid crystal display device as a third embodiment of the present invention.

That is, as shown in FIG. 9, the front viewing angle compensating film 6 set between a liquid crystal cell 1 and a front polarizing plate 2 is arranged in such a manner that an alignment axis 6a of discotic liquid crystal molecules is placed in parallel with a direction 16a of aligning treatment applied to a front homogeneous alignment film of the liquid crystal cell 1 (a direction of −45° with respect to a horizontal axis 1h of the liquid crystal display device), and a rear viewing angle compensating film 7 set between the liquid crystal cell 1 and a rear polarizing plate 3 is arranged in such a manner that an alignment axis 7a of discotic liquid crystal molecules is positioned in parallel with a direction 19a of aligning treatment applied to a rear homogeneous alignment film of the liquid crystal cell 1 (a direction of +45° with respect to the horizontal axis 1h of the liquid crystal display device).

According to the thus configured liquid crystal display device according to the third embodiment, retardation which remains in the liquid crystal layer 110 at the time of on due to an anchoring effect is effectively compensated by the front and rear viewing angle compensating films 6 and 7 arranged as described above. Therefore, as shown in FIG. 10, a viewing angle in a lateral direction (a horizontal direction of the liquid crystal display device) can be greatly improved as compared with the liquid crystal display device according to the second embodiment.

Figure 10:
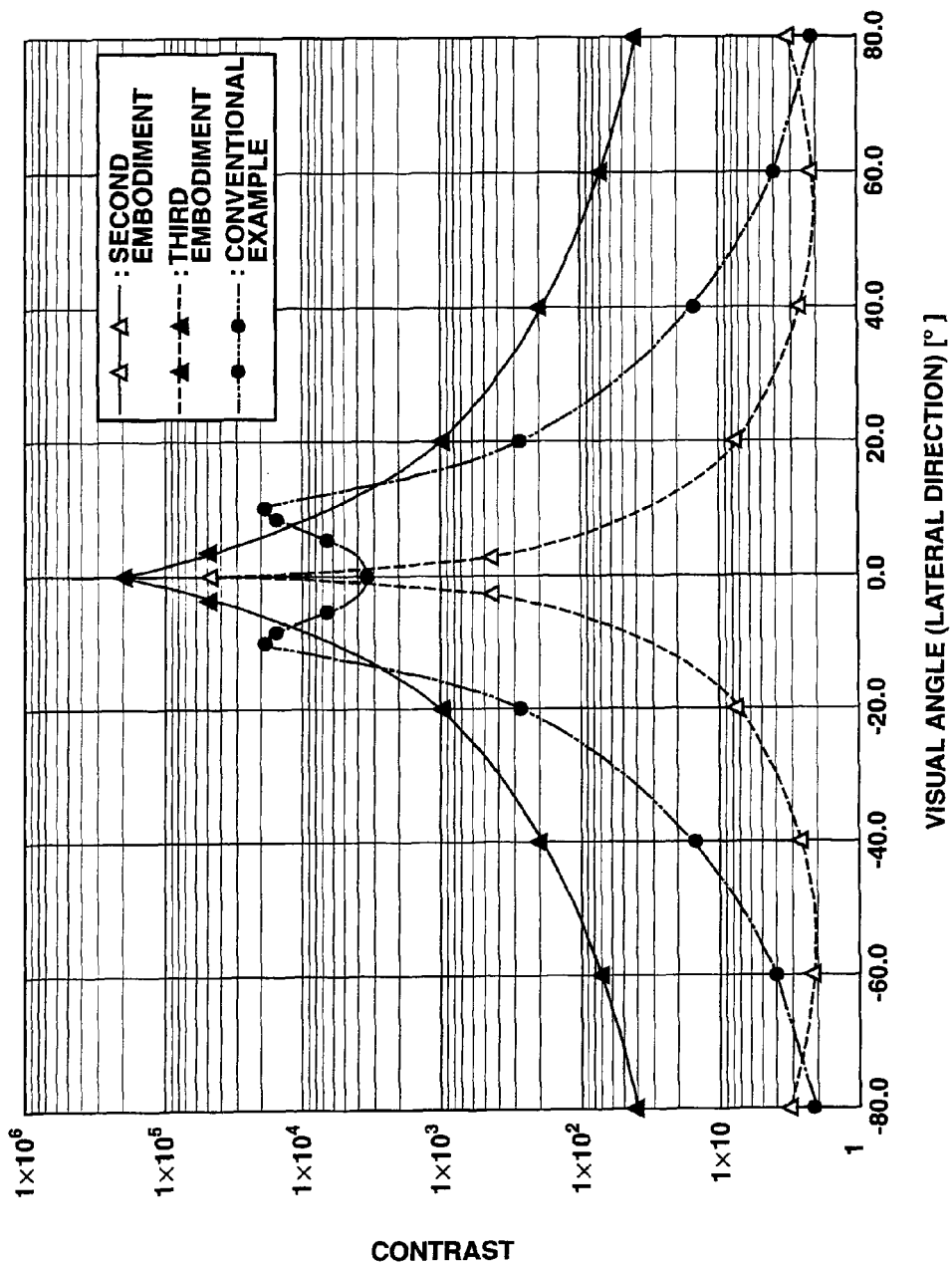
FIG. 10 is a graph showing viewing angle characteristics in a lateral direction in the liquid crystal display device according to the third embodiment.

That is, as apparent from FIG. 10, the liquid crystal display device according to the third embodiment has contrast of approximately 40 or above which is assured in a wide range of both right and left fiend angles of 80°, and also has considerably wide viewing angle characteristics as compared with the liquid crystal display device having the conventional configuration shown in FIG. 13.

As described above, in the liquid crystal display device according to the third embodiment, the directions of the respective alignment axes 6a and 7a of the viewing angle compensating films 6 and 7 including the pair of discotic liquid crystal layers arranged on both the front and rear sides with the liquid crystal cell 1 therebetween are set in parallel with the aligning treatment directions 16a and 19a of the corresponding homogeneous alignment films 16 and 19. As a result, the residual retardation of the liquid crystal cell 1 at the time of on is effectively compensated, and the viewing angle at least in the lateral direction in the display screen is improved. As a result, according to the liquid crystal display device according to the third embodiment, it is possible to obtain a color display quality with high color reproducibility by the liquid crystal display device according to the first embodiment as well as the excellent viewing angle characteristics sufficiently wide in the lateral direction.

The directions of the respective alignment axes 6a and 7a of the viewing angle compensating films 6 and 7 may be reversed from the above-described directions. That is, even if the direction of the alignment axis 6a of the front viewing angle compensating film 6 is set to a direction of +135° with respect to the lateral direction 1h and the direction of the alignment axis 7a of the rear viewing angle compensating film 7 is set to a direction of −135° with respect to the lateral direction 1h, the obtained effect remains unchanged.

(Fourth Embodiment)

Figure 11:
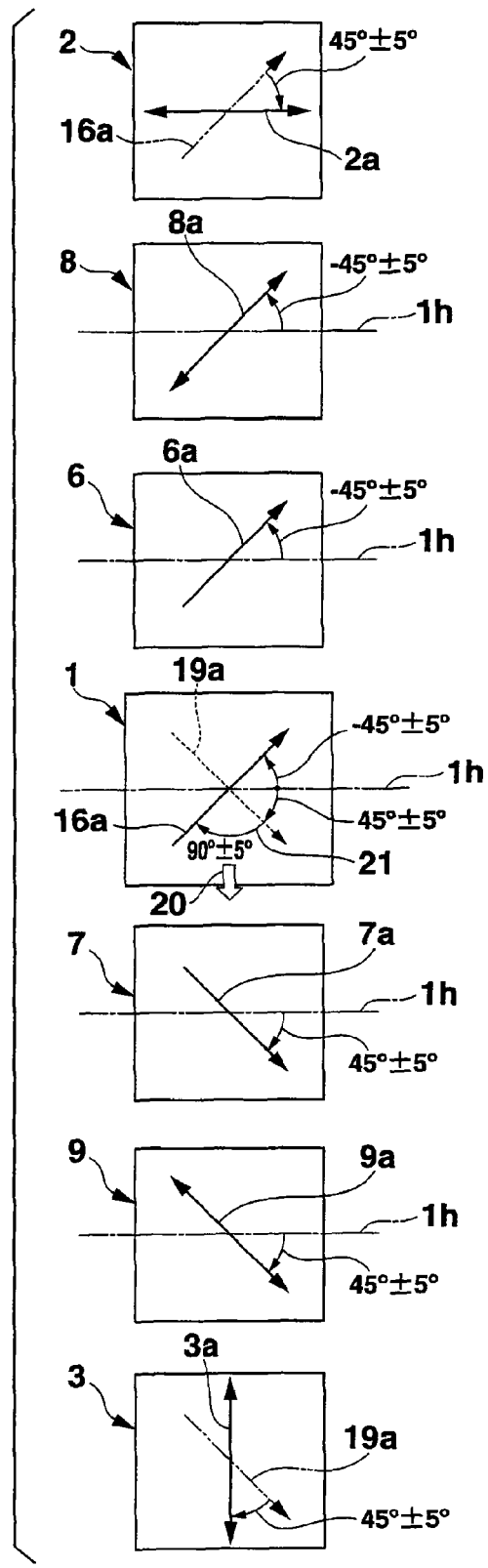
FIG. 11 is an exploded plan view showing a liquid crystal display device as a fourth embodiment of the present invention.

A liquid crystal display device according to a fourth embodiment has the multigap structure of the liquid crystal cell 1 in the liquid crystal display device according to the third embodiment, but a value of Δn·d of each of red, green and blue pixels is appropriately set in a range of 350 nm to 450 nm, and a front retardation plate 8 is arranged between a front viewing angle compensating film 6 and a front polarizing plate 2 whilst a rear retardation plate 9 is arranged between a rear viewing angle compensating film 7 and a rear polarizing plate 3 as shown in FIG. 11.

These front and rear retardation plates 8 and 9 have a product Δn·d of a refractive index anisotropy Δn and a thickness d being appropriately set within a range of 15 nm to 55 nm, and respectively include phase delaying axes 8a and 9a. Further, the front retardation plate 8 is set in such a manner that its phase delaying axis 8a becomes parallel with a direction of an alignment axis 6a of the superimposed front viewing angle compensating film 6, and the rear retardation plate 9 is set in such a manner that its phase delaying axis 9a becomes parallel with a direction of an alignment axis 7a of the superimposed rear viewing angle compensating film 7.

According to the thus configured liquid crystal display device according to the fourth embodiment, a retardation compensating effect by each of the front and rear viewing angle compensating films 6 and 7 is further improved by each of the front and rear retardation plates 8 and 9 superimposed with their optical axes being matched, and residual retardation at the time of on is compensated. Therefore, as shown in FIG. 12, viewing angle characteristics in a lateral direction (a direction of a horizontal axis) is further improved as compared with the liquid crystal display device according to the third embodiment.

Figure 12:
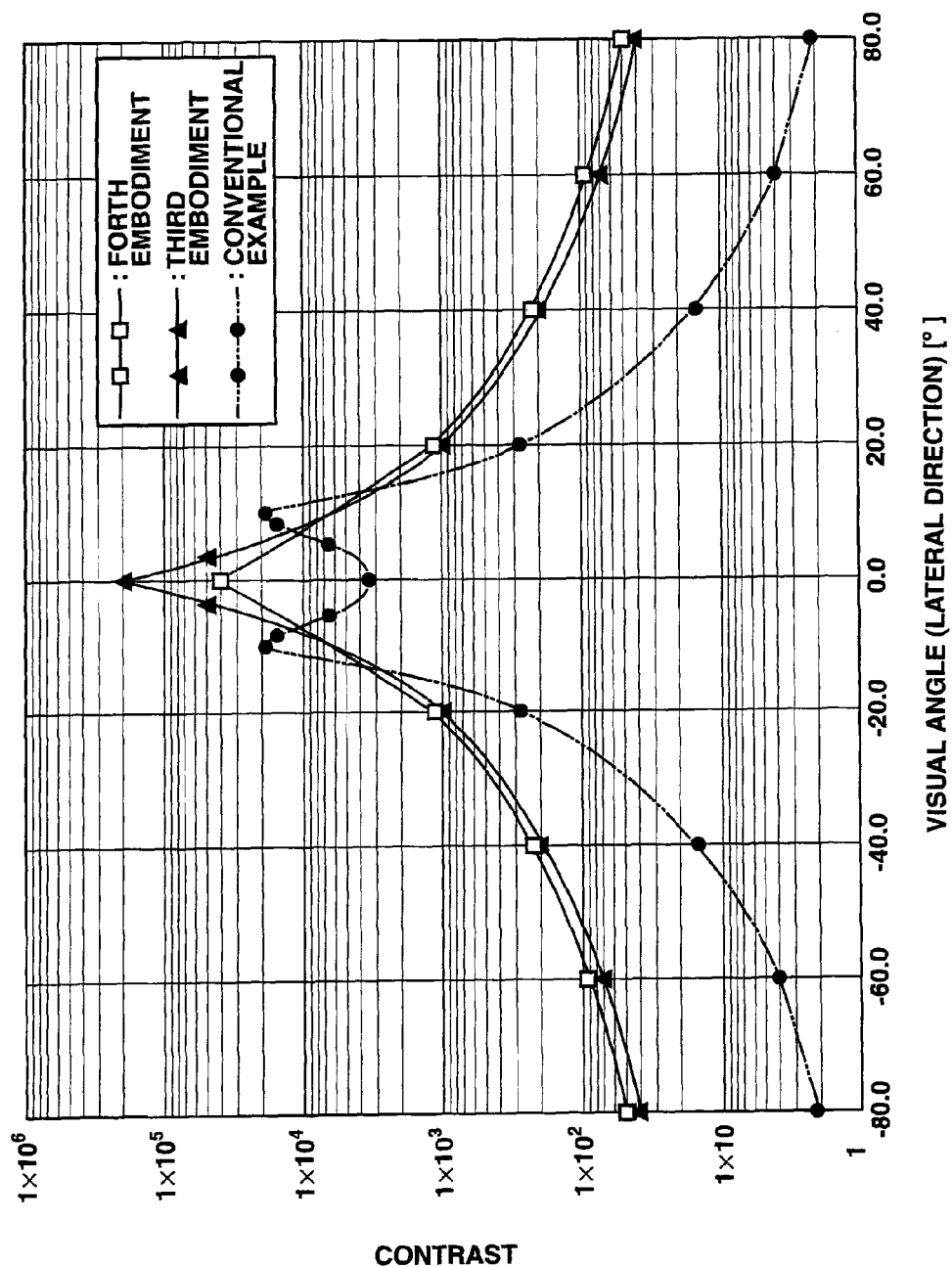
FIG. 12 is a graph showing viewing angle characteristics in a lateral direction in the liquid crystal display device according to the fourth embodiment.

That is, as apparent from FIG. 12, contrast which is approximately 50 or above is assured in a wide range of both right and left viewing angles of 80°, which is higher than the contrast of 40 or above in the same range of the liquid crystal display device according to the third embodiment. Therefore, the contrast is uniformly improved in the entire viewing angle range excluding the vicinity of a front direction.

As described above, in the liquid crystal display device according to the fourth embodiment, the viewing angle compensating films 6 and 7 including the discotic liquid crystal layers and the respective retardation plates 8 and 9 are superimposed on both the front and rear sides with the liquid crystal cell 1 therebetween in such a manner that the respective optical axes are aligned in parallel with the aligning treatment directions 16a and 19a of the corresponding homogeneous alignment films 16 and 19. Therefore, residual retardation in the liquid crystal cell 1 at the time of on can be effectively compensated, and the viewing angle at least in the lateral direction in the display screen can be further improved. As a result, according to the liquid crystal display device of the fourth embodiment, it is possible to obtain a color display quality having excellent color reproducibility realized by the liquid crystal display device according to the first embodiment as well as excellent viewing angle characteristics with the viewing angle further widened in at least the horizontal axis direction.

In case of the fourth embodiment, like the liquid crystal display device according to the third embodiment, directions of the respective alignment axes 6a and 7a of the viewing angle compensating films 6 and 7 may be reversed from the above-described directions. The effect obtained in this case is the same as the above-described effect.

The present invention is not restricted to the first to fourth embodiments. For example, in the first to fourth embodiments, the arrangement of the transmission axis 3a of the rear polarizing plate 3 matches with the direction of the intermediate angle in the twist alignment angle range of the liquid crystal molecules in the liquid crystal cell 1. However, it is good enough to match the transmission axis 3a of this rear polarizing plate 3 with the third direction along which the liquid crystal molecules in the vicinity of the homogeneous alignment film on a corresponding side at the time of on where an electric field is sufficiently applied to the liquid crystal layer 110. For example, even if the third direction is a direction of an angle which is approximately ⅓ of the range of the twist alignment angle of the liquid crystal molecules, matching the transmission axis 3a of the rear polarizing plate 3 with this direction can suffice.

Furthermore, the present invention is not restricted to the color liquid crystal display device in which the color filters are provided, and it can be effectively applied to a liquid crystal display device which performs monochrome display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A liquid crystal display device comprising:
first and second polarizing plates which are arranged such that respective transmission axes thereof are perpendicular to each other;
a liquid crystal cell which is arranged between the first and second polarizing plates;
a first viewing angle compensating film which is arranged between the first polarizing plate and the liquid crystal cell, and which includes discotic liquid crystal; and
a second viewing angle compensating film which is arranged between the second polarizing plate and the liquid crystal cell, and which includes discotic liquid crystal;
wherein the liquid crystal cell includes:
 a first substrate having at least one first electrode;
 a second substrate having at least one second electrode, the first substrate being arranged between the first viewing angle compensating film and the second substrate; and
 a liquid crystal layer which is provided between the first and second electrodes;
 wherein the liquid crystal layer is set such that liquid crystal molecules of the liquid crystal layer are twist-aligned from a first molecular aligning direction on a side of the liquid crystal layer adjacent to the first substrate toward a second molecular aligning direction on a side of the liquid crystal layer adjacent to the second substrate, when no voltage is applied between the first and second electrodes, wherein the first molecular aligning direction is substantially perpendicular to the second molecular aligning direction;
wherein an aligning axis of the first viewing angle compensating film extends in the first molecular aligning direction, and an aligning axis of the second viewing angle compensating film extends in the second molecular aligning direction;
wherein the aligning axis of the first viewing angle compensating film is substantially perpendicular to the aligning axis of the second viewing angle compensating film;
wherein an angle between the transmission axis of the first polarizing plate and the first molecular aligning direction is substantially ½ of an angle between the first and second molecular aligning directions, and an angle between the transmission axis of the first polarizing plate and the aligning axis of the first viewing angle compensating film is substantially ½ of an angle between the first and second molecular aligning directions;
wherein an angle between the transmission axis of the second polarizing plate and the second molecular aligning direction is substantially ½ of the angle between the first and second molecular aligning directions, and an angle between the transmission axis of the second polarizing plate and the aligning axis of the second viewing angle compensating film is substantially ½ of the angle between the first and second molecular aligning directions;
wherein, where a refractive index anisotropy of a region of the liquid crystal layer with respect to blue wavelength light is represented by $\Delta nb$, a refractive index anisotropy of a region of the liquid crystal layer with respect to green wavelength light is represented by $\Delta ng$, and a refractive index anisotropy of a region of the liquid crystal layer with respect to red wavelength light is represented by $\Delta nr$, the anisotropies satisfy the following ranges:

$\Delta nb/\Delta ng = 1.04 \pm 0.03$, and $\Delta nr/\Delta ng = 0.96 \pm 0.03$; and wherein, where a layer thickness of the region of the liquid crystal layer with respect to the blue wavelength light is represented by db, a layer thickness of the region of the liquid crystal layer with respect to the green wavelength light is represented by dg, and a layer thickness of the region of the liquid crystal layer with respect to the red wavelength light is represented by dr, each of $\Delta nb \cdot db$, $\Delta ng \cdot dg$, and $\Delta nr \cdot dr$ is set within a range of 450 nm to 550 nm.

2. The liquid crystal display device according to claim 1, wherein the liquid crystal molecules of the liquid crystal layer comprise liquid crystal molecules having a positive dielectric anisotropy.

3. The liquid crystal display device according to claim 1, further including a backlight, the first polarizing plate being provided between the backlight and the liquid crystal cell.

4. The liquid crystal display device according to claim 1, wherein the liquid crystal cell has a rectangular shape having four sides as seen from an observation side of the liquid crystal display device; and
wherein the liquid crystal molecules of the liquid crystal layer are twist-aligned such that a line equally dividing the angle between the first and second molecular aligning directions is parallel or perpendicular to each side of the liquid crystal cell.

5. The liquid crystal display device according to claim 1, wherein the first substrate has a first aligning film covering the first electrode, the second substrate has a second aligning film covering the second electrode, and the liquid crystal molecules of the liquid crystal layer are aligned in accordance with first and second aligning treatment directions of the first and second aligning films.

6. The liquid crystal display device according to claim 1, wherein the liquid crystal display device has a contrast of approximately 40 at viewing angles of 80° toward left and 80° toward right with respect to a front direction, and a contrast in the front direction of at least $1 \times 10^5$.

7. The liquid crystal display device according to claim 1, wherein the liquid crystal cell includes a plurality of color filters arranged in accordance with respective pixels, and a thickness of the liquid crystal layer is set to different values in accordance with the respective pixels corresponding to the color filters having the different colors.

8. The liquid crystal display device according to claim 1, wherein each of the first and second viewing angle compensating films further comprises a transparent film substrate and an aligning film formed on one surface of the film substrate.

9. The liquid crystal display device according to claim 8, wherein each of the first and second viewing angle compensating films comprises a discotic liquid crystal layer provided on the aligning film.

10. The liquid crystal display device according to claim 9, wherein in each of the first and second viewing angle compensating films:
discotic liquid crystal molecules of the discotic liquid crystal layer have a disc shape with opposite flat surfaces; and
the discotic liquid crystal molecules positioned adjacent to the aligning film are aligned such that the flat surfaces are substantially parallel to the film substrate, and the discotic liquid crystal molecules positioned apart from the aligning film are aligned such that the flat surfaces are inclined with respect to the film substrate at the inclination angles, wherein the inclination angles increase as the discotic liquid crystal molecules increase in distance from the aligning film.

11. The liquid crystal display device according to claim 10, wherein in each of the first and second viewing angle compensating films, the discotic liquid crystal layer develops a negative optical anisotropy in which an optical axis of the discotic liquid crystal layer along which a refractive index becomes minimum is provided in a direction along which the inclination angles are averaged.

* * * * *